US012766651B2

(12) United States Patent
Rolandi

(10) Patent No.: US 12,766,651 B2
(45) Date of Patent: Oct. 20, 2026

(54) LOCKING SYSTEM FOR MECHANICAL COMPONENTS

(71) Applicant: OFFICINA MECCANICA LOMBARDA S.R.L., Caprie (IT)

(72) Inventor: Andrea Rolandi, Montalto Pavese (IT)

(73) Assignee: OFFICINA MECCANICA LOMBARDA S.R.L., Caprie (IT)

( * ) Notice: Subject to any disclaimer, the term of this patent is extended or adjusted under 35 U.S.C. 154(b) by 271 days.

(21) Appl. No.: 18/776,625

(22) Filed: Jul. 18, 2024

(65) Prior Publication Data

US 2025/0033154 A1 Jan. 30, 2025

(30) Foreign Application Priority Data

Jul. 26, 2023 (IT) ........................ 102023000015645

(51) Int. Cl.
*B23Q 1/44* (2006.01)

(52) U.S. Cl.
CPC ..................................... *B23Q 1/44* (2013.01)

(58) Field of Classification Search
CPC ........ B23Q 1/44; B23Q 1/0072; B23Q 3/103; B23Q 16/00; B23Q 3/18; F16B 21/16; B25B 5/006; Y10T 29/49895
See application file for complete search history.

(56) References Cited

U.S. PATENT DOCUMENTS

| | | | | |
|---|---|---|---|---|
| 8,708,323 B2 | 4/2014 | Hoyt et al. | | |
| 2020/0189051 A1* | 6/2020 | Taylor | .................... | B23Q 3/103 |
| 2022/0212299 A1 | 7/2022 | Lang et al. | | |
| 2023/0017767 A1 | 1/2023 | Taylor et al. | | |

FOREIGN PATENT DOCUMENTS

DE 202018105390 U1 9/2018

OTHER PUBLICATIONS

Italian Search Report dated Feb. 19, 2024 issued in IT 202300015645.

* cited by examiner

*Primary Examiner* — Jason L Vaughan
*Assistant Examiner* — Amanda Kreiling
(74) *Attorney, Agent, or Firm* — Scully, Scott, Murphy & Presser, P.C.

(57) ABSTRACT

A platform has a support surface for a mechanical component and is provided with at least two locking seats. The locking seats coaxially receive respective locking pins which are fixed to a mechanical component and are provided with respective circumferential grooves adapted to be restrainedly engaged by retention elements associated with the platform. The retention elements comprise a rotary retention element that can rotate about an axis of rotation which is perpendicular to the support surface for rotating between a releasing position and a locking position upon control of actuation elements, and is provided with a peripheral edge which, at each of the locking seats, has a contoured surface so as to restrainedly engage the grooves when the rotary retention element is in the locking position, and disengage the grooves when the rotary retention element is in the releasing position.

10 Claims, 8 Drawing Sheets

LOCKING SYSTEM FOR MECHANICAL COMPONENTS

The present invention relates to a locking system for mechanical components.

In the present description, the term "mechanical components" is generally understood to mean both fixtures for fixing workpieces adapted to be machined on machine tools, such as vises and the like, and directly the workpieces to be machined. However, for simplicity of exposition, reference will be made to the first case and, more specifically, to the locking of a vise.

As is known, a workpiece designed to be machined on machine tools can be fixed to a vise, which, in turn, can be installed in a fixed position in the work area of the machine tool by means of a locking system.

Generally, a locking system can comprise a platform provided with a series of locking seats, typically four locking seats arranged in a square pattern. The locking seats are adapted to coaxially receive respective locking pins which are fixed, with an identical square arrangement, either directly to the vise or, more commonly, to a fixing plate which acts as an interface and to which the vise is fixed.

Each of the locking pins is provided with a circumferential groove that is adapted to be engaged by respective retention means associated with the platform.

In known locking systems, the retention means generally comprise a series of locking inserts received slidingly in respective seats of the platform. Each of the locking inserts can slide radially, relative to a respective one of the four locking pins, between a locking position, in which it engages the groove of the locking pin, and a releasing position, in which it releases the locking pin, allowing it to be inserted into and extracted from the respective locking seat.

The locking inserts are actuated by respective actuation elements, which, in known locking systems, can comprise for example a series of sliding transmission elements which are mutually coupled by means of inclined planes and are movable upon control of a screw-type actuator, or a hydraulic piston transmission, or also a rotating cam which acts on the locking inserts.

Known locking systems, owing to the many sliding mechanical elements that form the retention means, have the drawback of being particularly subject to play and susceptible to wear, with negative consequences on positioning accuracy and with the consequent need for frequent maintenance or replacement interventions.

The aim of the present invention is therefore to provide a locking system for mechanical components that is less subject to play and less susceptible to wear than known systems, so as to improve positioning accuracy and reduce the need for maintenance or replacement interventions.

This aim and other objects of the invention that will become better apparent from the description that follows are achieved by a locking system having the features described in claim 1, while the dependent claims define other advantageous characteristics of the invention.

The invention will now be described in greater detail, with reference to some preferred but not exclusive embodiments, illustrated by way of non-limiting example in the accompanying drawings, wherein.

Figure 1:
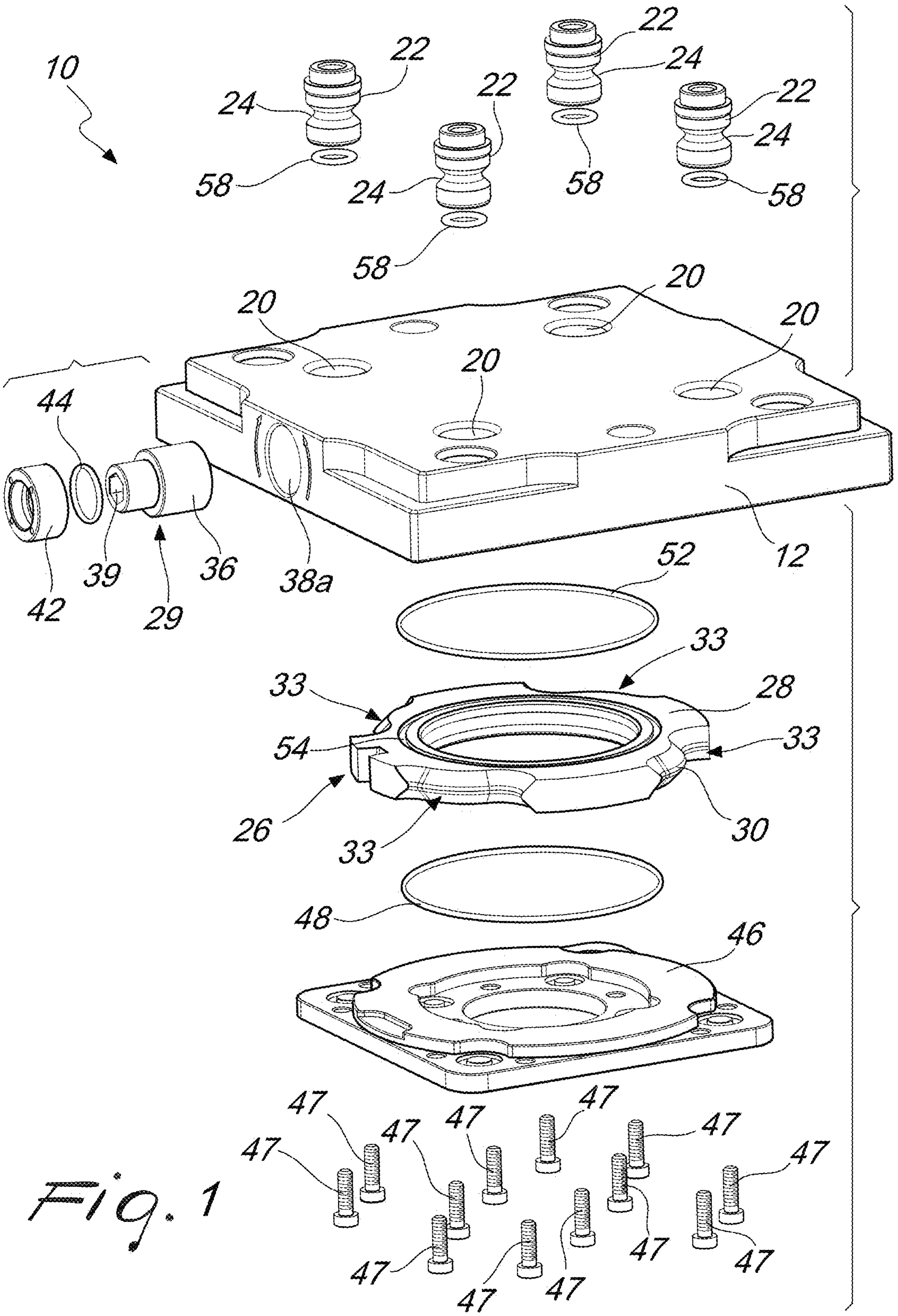
FIG. 1 is an exploded perspective view of the locking system according to the invention.
Figure 2:
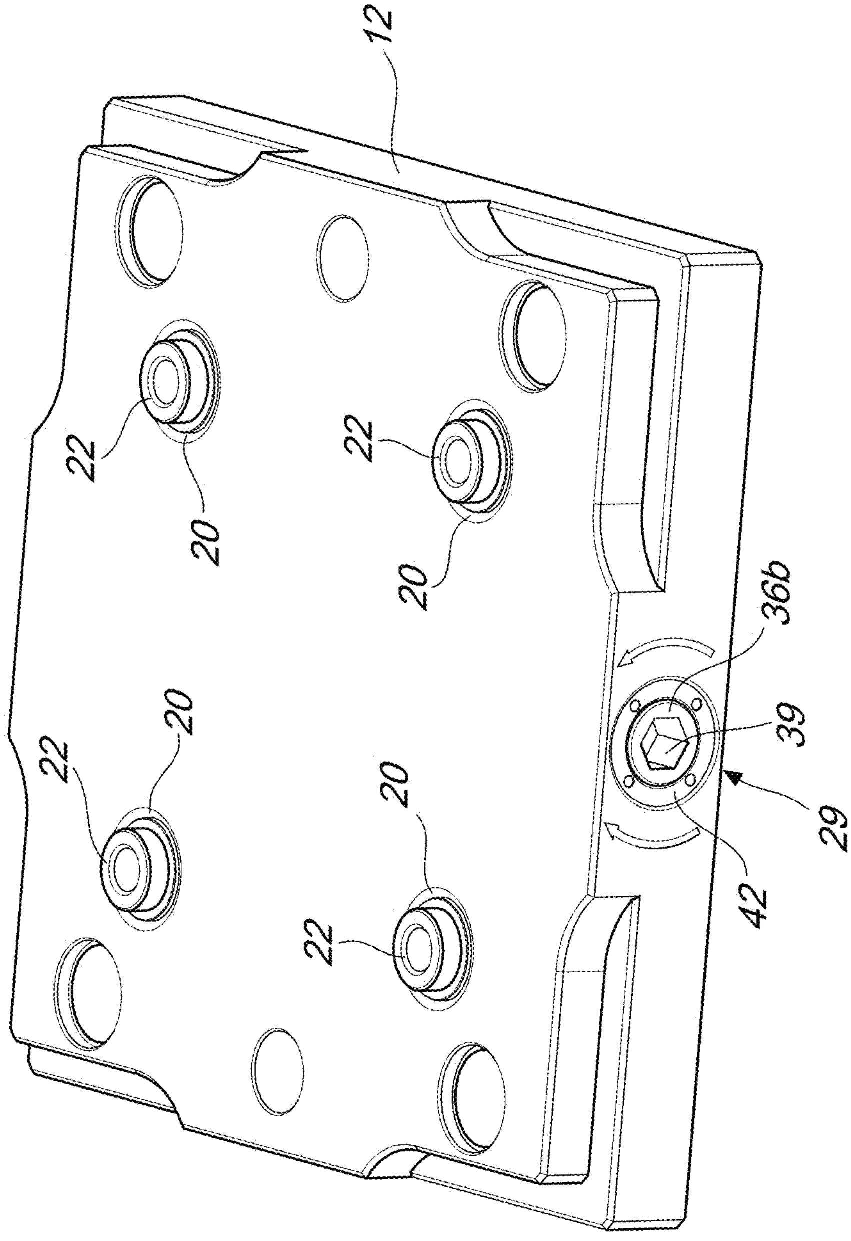
FIG. 2 is an assembled perspective view of the locking system according to the invention.
Figure 3:
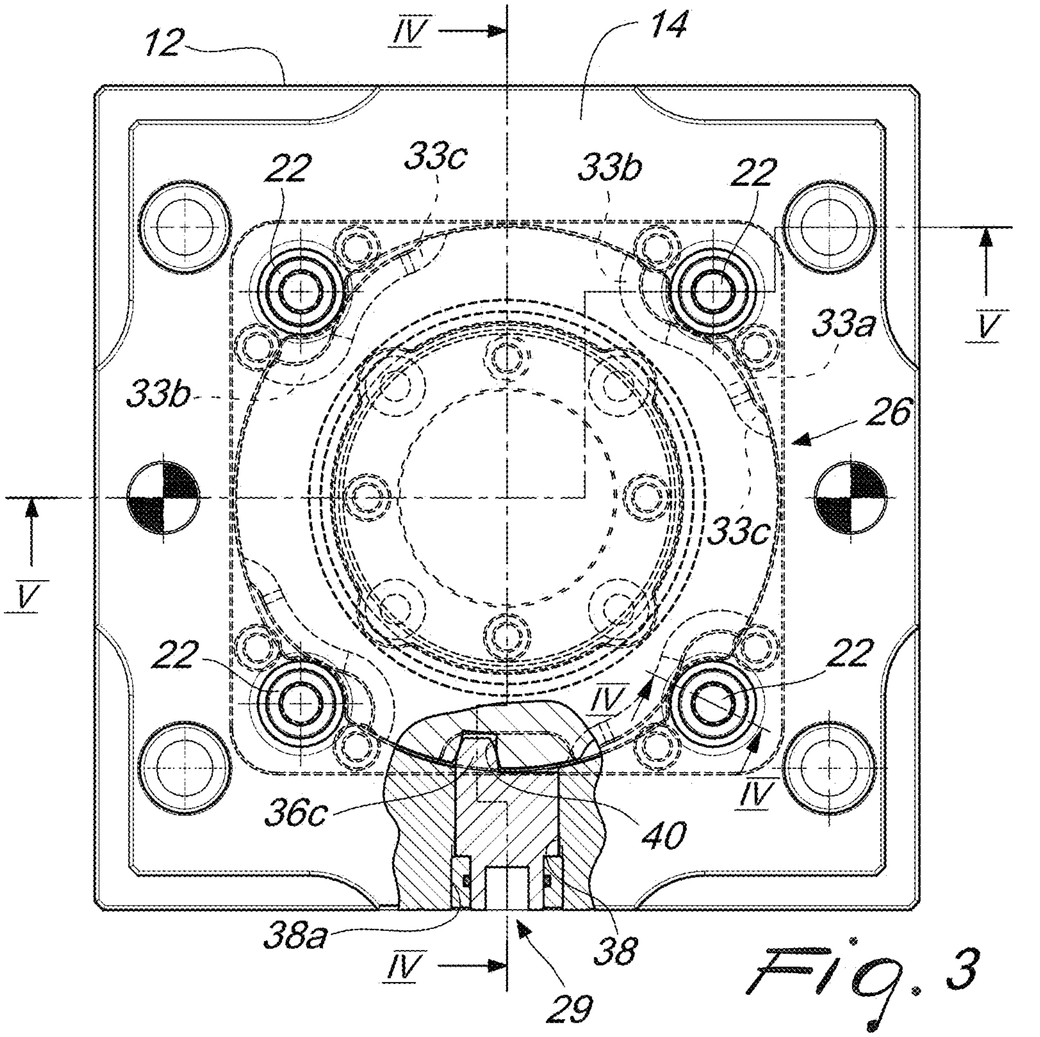
FIG. 3 is a partially sectional plan view of the locking system of FIG. 1.
Figure 4:
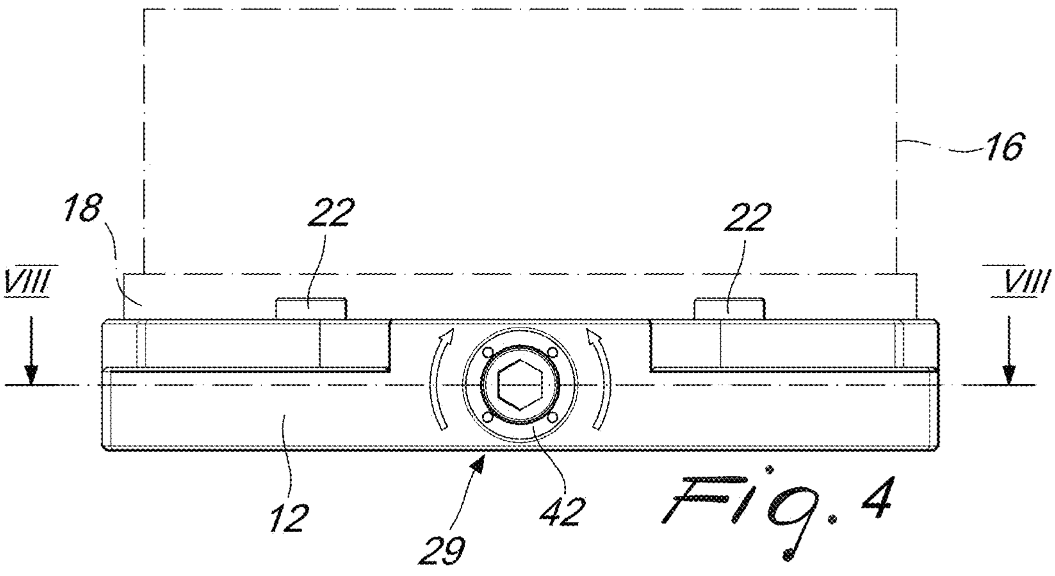
FIG. 4 is a lateral elevation view of the locking system of FIG. 1.
Figure 5:
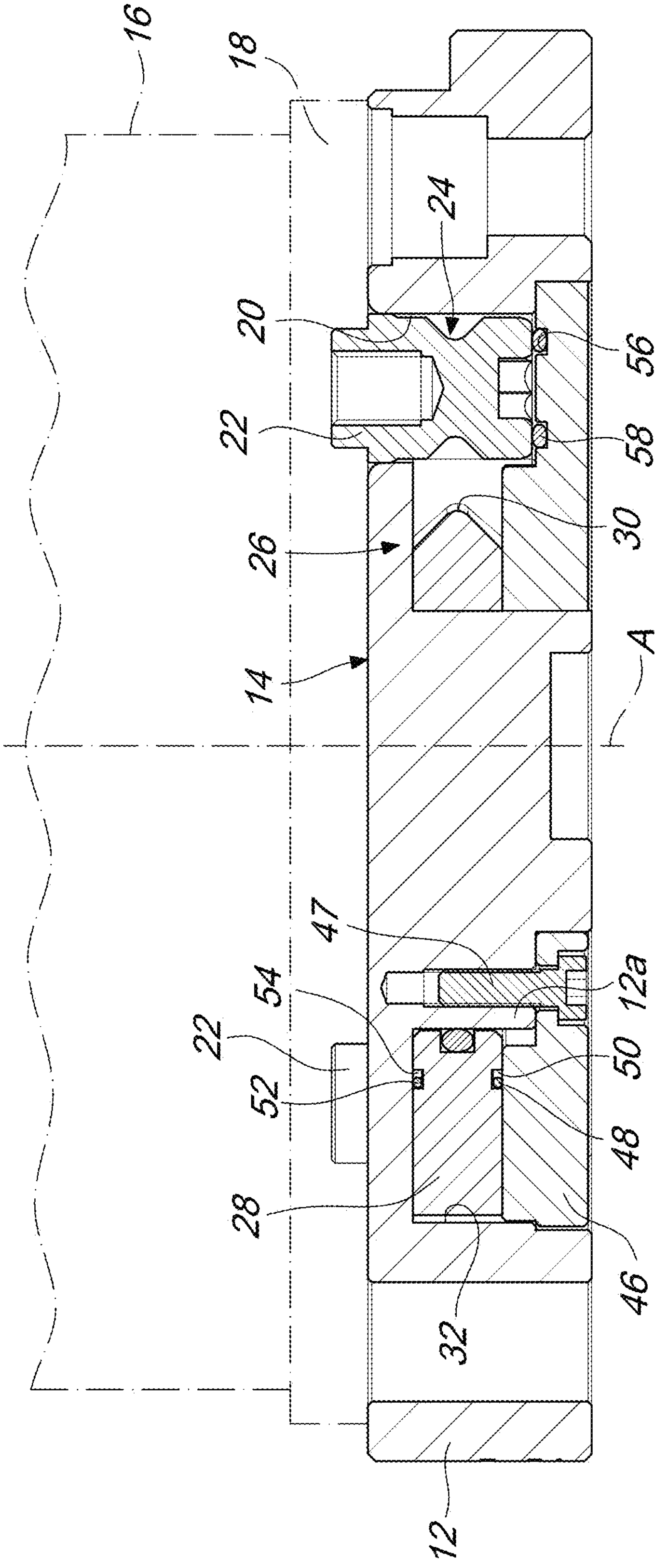
FIG. 5 is a sectional view of FIG. 3, taken along the plane V-V.

With reference to FIGS. 1-11, the reference numeral 10 generally designates a locking system for mechanical components according to the present invention.

The locking system 10 comprises a platform 12 which has a support surface 14 on which a mechanical component is adapted to be supported, for example a vise 16 (shown only schematically in FIGS. 4, 5 and 7) for fixing workpieces designed to be machined on machine tools. The vise 16 (or other mechanical component) can be supported on the support surface 14 either directly or (as in the example shown and described here) with the interposition of a fixing plate 18 (also shown only schematically in FIGS. 4, 5 and 7), which acts as an interface.

The platform 12 is provided with a series of locking seats 20, particularly four locking seats 20 arranged in a square in the example described here, which extend around respective axes which are perpendicular to the support surface 14 and open onto the latter.

The locking seats 20 are adapted to receive coaxially respective locking pins 22, of the per se known type, which are fixed at right angles to the fixing plate 18 in an identical square arrangement.

Each of the locking pins 22 has a substantially cylindrical profile and is provided with a circumferential groove 24 that is adapted to be restrainedly engaged by retention means 26 associated with the platform 12.

Figure 6:
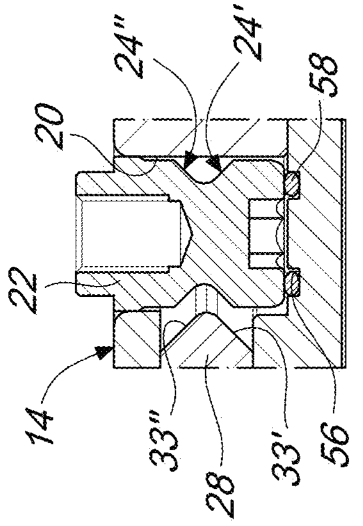
FIG. 6 is a sectional view of FIG. 3, taken along the plane VI-VI.
Figure 7:
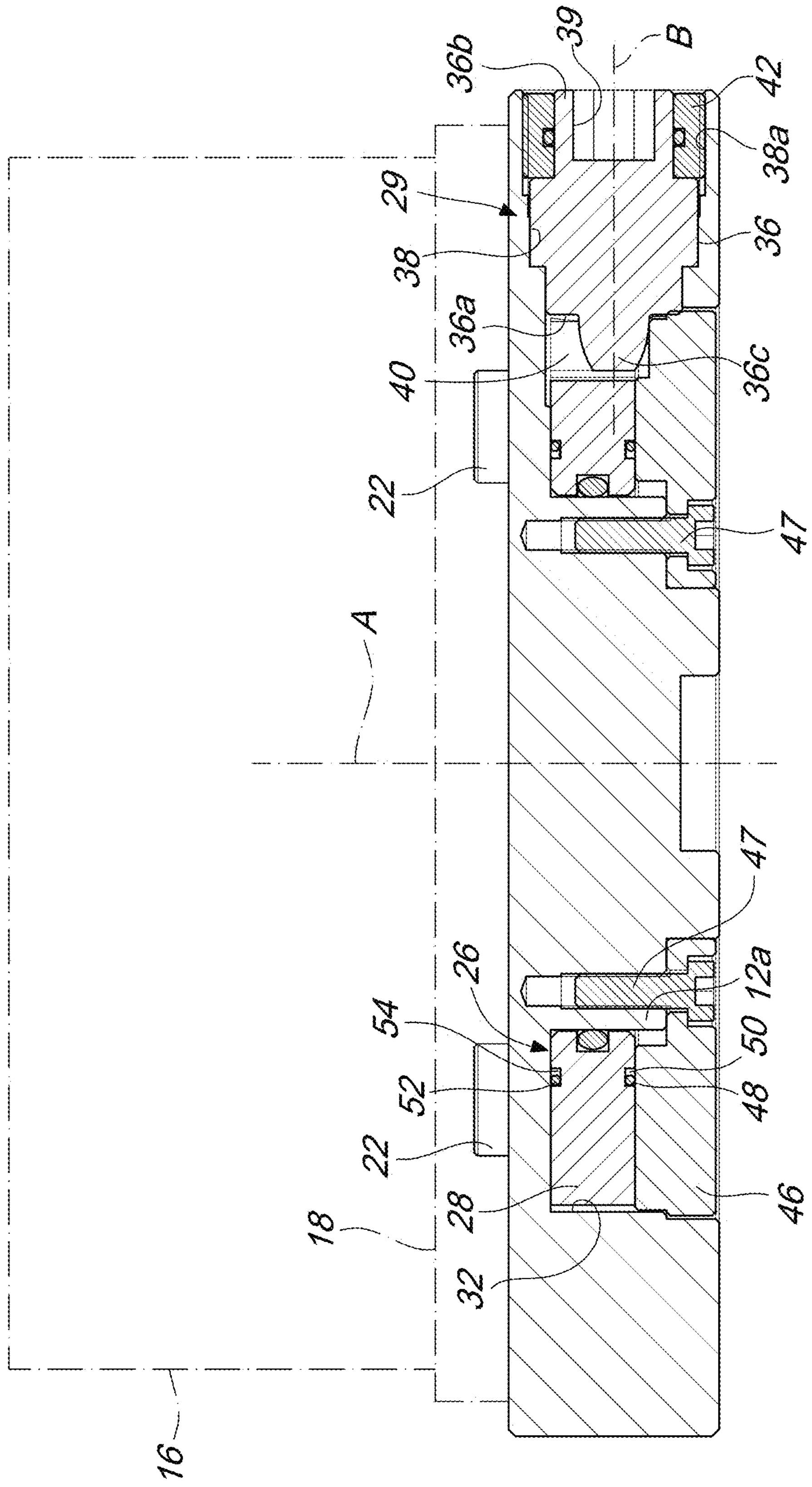
FIG. 7 is a sectional view of FIG. 3, taken along the plane VII-VII.

With reference to FIG. 6, the groove 24 is delimited axially between a first frustoconical surface 24', which is directed toward the fixing plate 18 and is adapted to be engaged by the retention means 26, and a second frustoconical surface 24" that faces coaxially the first one.

The retention means 26 according to the invention comprise a retention element 28, which is supported by the platform 12 so that it can rotate about an axis of rotation A which is perpendicular to the support surface 14 to rotate between a releasing position and a locking position upon control of actuation means 29, and is provided with a peripheral edge 30 which, at each of the locking seats 20, has a contoured surface 33 having a such a profile as to restrainedly engage the circumferential grooves 24 of the locking pins 22 when the retention element 28 is rotated into the locking position and disengage the circumferential grooves 24 when the retention element 28 is rotated into the releasing position.

In the embodiment described herein, the retention element 28 has a substantially annular profile and is accommodated in a cavity 32 of the platform 12 that has a substantially complementary annular profile and intersects the four locking seats 20.

In particular, the retention element 28 is fitted rotatably over a cylindrical portion 12*a* of the platform 12 that delimits the internal annular profile of the cavity 32.

Figure 9:
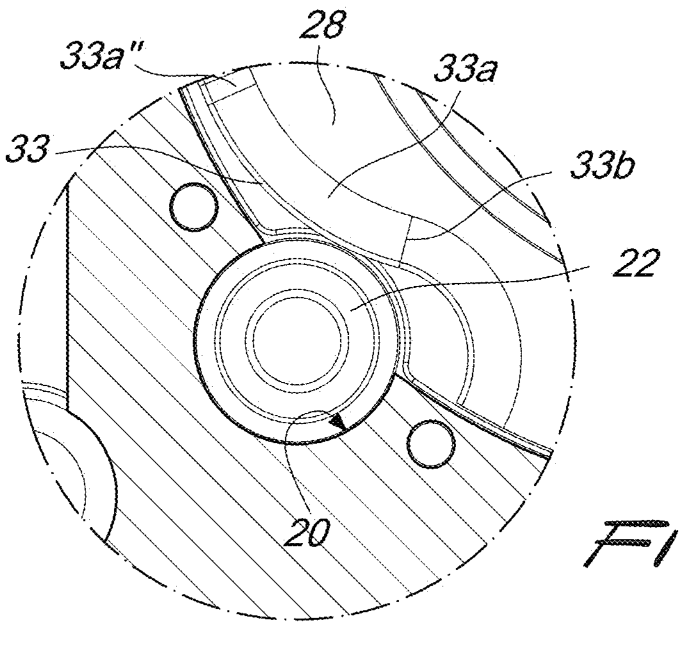
FIG. 9 is an enlarged-scale view of a detail of FIG. 8.
Figure 11:
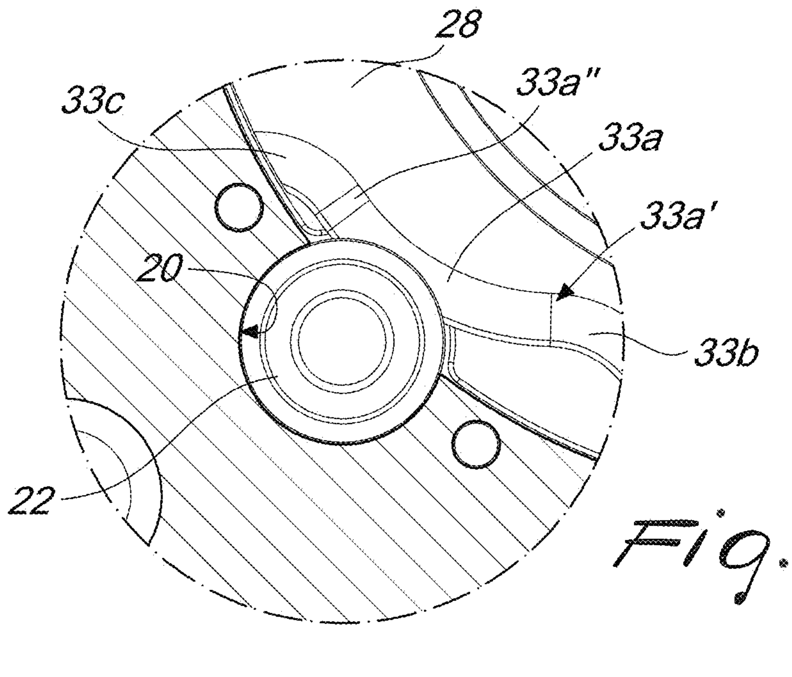
FIG. 11 is an enlarged-scale view of a detail of FIG. 10.

With reference now to FIGS. 9 and 11, each of the four contoured surfaces 33 is provided with a contact portion 33*a* that is delimited between a first end 33*a*' and a second end 33*a*" and has an outer profile that progressively recedes from the axis of rotation A, so as to engage the groove 24 at a point which is intermediate between the first end 33*a*' and the second end 33*a*" when the retention element 28 is in the locking position, and disengage the groove 24 when the retention element 28 is in the releasing position.

In the embodiment described here, the contact portion 33*a* advantageously has a circular arc-shaped profile with the concavity directed inward (i.e., toward the axis of rotation A).

Moreover, in the embodiment described here, the peripheral edge 30 of the retention element 28 has a generally cylindrical profile, and each of the contoured surfaces 33 forms a recess of said cylindrical profile. In particular, in this embodiment, the contact portion 33*a* is comprised between a first end portion 33*b*, advantageously having a circular arc-shaped profile with the concavity directed outward and a diameter greater than or equal to the diameter of the locking pin 20, and a second end portion 33*c*, advantageously having a circular arc-shaped profile with the concavity directed outward and a diameter that is smaller than the diameter of the locking pin 20.

Preferably, the contact portion 33*a* has a larger diameter than the first end portion 33*b*.

Figure 8:
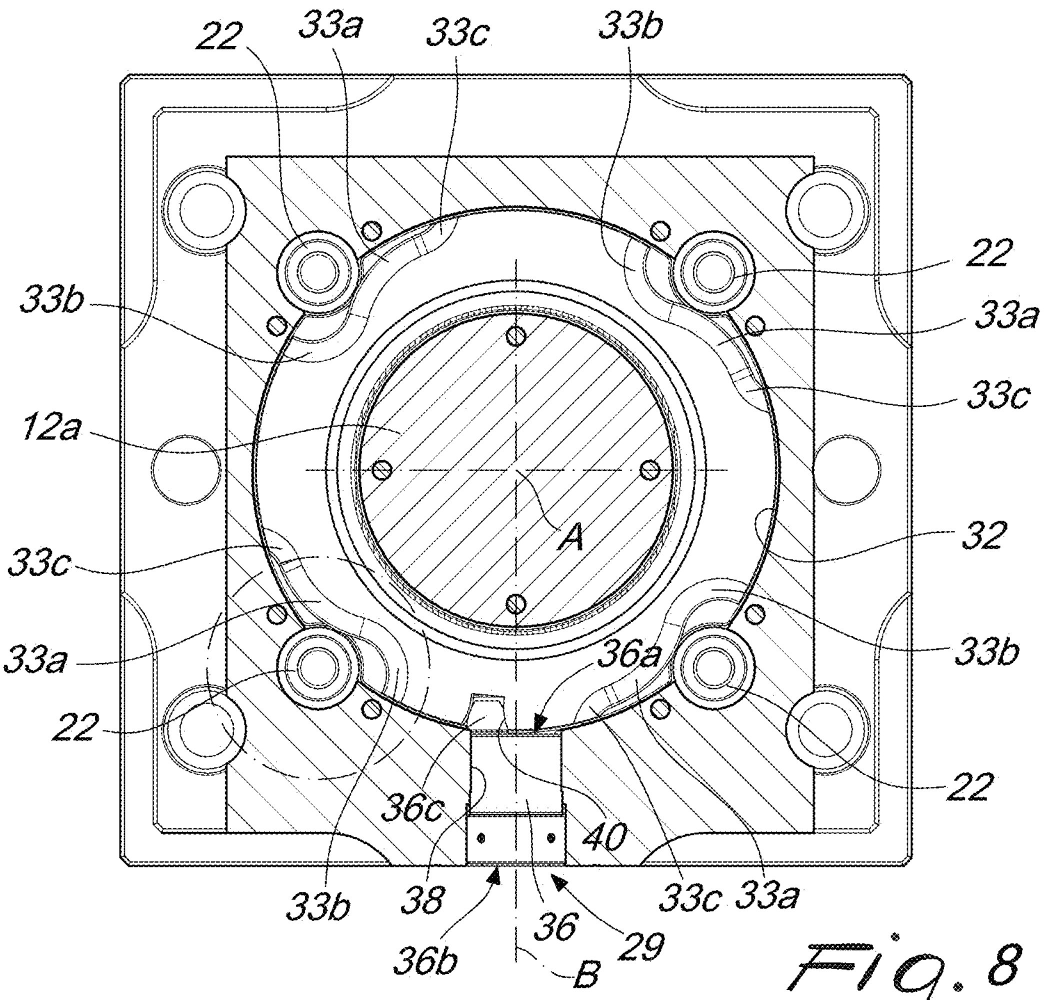
FIG. 8 is a sectional view of FIG. 4, taken along the plane VIII-VIII, showing the locking system according to the invention in an initial operating configuration.

With the retention element 28 in the releasing position, each of the contoured surfaces 33 faces the respective locking seat 20 in such a position as to not interfere with the profile of the locking pin 22 (FIGS. 8 and 9).

Figure 10:
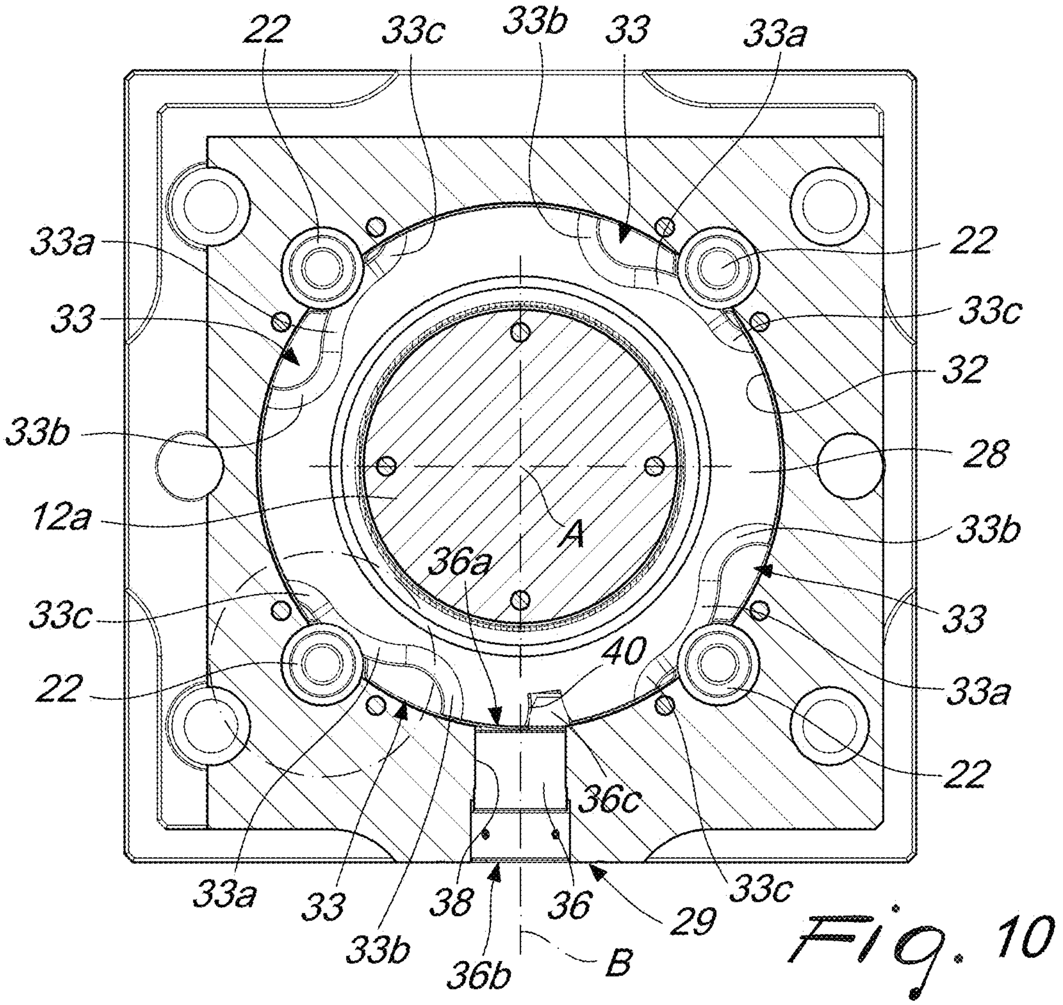
FIG. 10 is a view similar to FIG. 8, showing the locking system according to the invention in a second operating configuration.

With the retention element 28 in the locking position, each of the contoured surfaces 33 enters the respective locking seat 20 and engages the first surface 24*a* of the groove 24 (FIGS. 10 and 11).

Preferably, with reference to FIG. 6, each of the contoured surfaces 33 has a chamfered edge at least on the side directed toward the first frustoconical surface 24', so as to engage the latter with a first oblique face 33' of the contact portion 33*a* that has the same inclination.

Preferably, and again with reference to FIG. 6, each of the four contoured surfaces 33 also has a chamfered edge on the side directed toward the second frustoconical surface 24', so as to face the latter with a second oblique face 33" of the contact portion 33*a* that has the same inclination.

With reference now to FIGS. 7-11, in the embodiment described herein the actuation means 29 comprise a rotary actuator 36 that is supported by the platform 12 so that it can rotate about an actuation axis B. In this embodiment, the rotary actuator 36 has a substantially cylindrical profile and is rotatably inserted in a through hole 38 of the platform 12 that extends around the actuation axis B. Moreover, in this embodiment, the actuation axis B is extended radially with respect to the rotation axis A. The rotary actuator 36 has an inner end 36*a* which faces the peripheral edge 30 of the retention element 28, and an outer end 36*b* contoured to allow manual locking of the rotary actuator 36. In this embodiment, the outer end 36*b* of the rotary actuator 36 has a hexagonal seat 39 that can be engaged by a corresponding hexagonal locking wrench (not shown). The inner end 36*a* of the rotary actuator 36 has an eccentric tab 36*c* which engages a corresponding seat 40 on the retention element 28 in a position that is spaced from the axis of rotation A. In this embodiment, the seat 40 is provided on the peripheral edge 30 of the retention element 28 between two contoured surfaces 33 that define recesses.

The rotary actuator 36 is retained in the through hole 38 by an externally threaded ring 42, with the interposition of a sealing ring 44. The ring 42 is screwed onto a correspondingly threaded outer portion 38*a* of the through hole 38.

A cover 46 screwed onto the cylindrical portion 12*a* of the platform 12 by means of a series of screws 47 defines one of the two axial ends of the cavity 32.

A first annular gasket 48, accommodated in an annular groove 50 of the retention element 28, is interposed between the cover 46 and the retention element 28.

A second annular gasket 52 is interposed between the retention element 28 and the face of the platform 12 that is opposite with respect to the support surface 14, which defines the other axial end of the cavity 32; said second annular gasket is accommodated in a second annular groove 54 of the retention element 28.

The surface of the cover 46 that is directed toward the cavity 32 has four additional annular grooves 56 which are aligned with the locking seats 20 and accommodate respective additional annular gaskets 58 against which the locking pins 22 are adapted to abut.

The operation of the locking system is shown in detail in FIGS. 8-11.

When the retention element 28 is in the releasing position, the fixing plate 18, on which the vise 16 is mounted, can be rested on the support surface 14 of the platform 12, and the locking pins 22 are free to enter the corresponding locking seats 20 (FIGS. 8 and 9). In this configuration, the contoured surfaces 33 face the respective locking seats 20 but do not interfere with the passage of the locking pin 22.

In order to lock the plate 18 on platform 12, the rotary actuator 36 is rotated by means of a hex key (not shown), causing the retention element 28 to rotate from the releasing position of FIGS. 8 and 9 to the locking position of FIGS. 10 and 11 by engagement of the eccentric tab 36*c* in the seat 40 of the retention element 28.

In the locking position, the first oblique faces 33' of the contact portions 33*a* of the contoured surfaces 33 restrainedly engage the first frustoconical surfaces 24' of the grooves 24 of the locking pins 22, so as to clamp the fixing plate 18 against the support surface 14 of the platform 12. The circular arc-shaped profile of the contact portion 33*a* causes the ratio between the clamping force and the angle of rotation of the retention element 28 to increase progressively as the rotary actuator 36 is tightened.

Of course, to release the mechanical component it is sufficient to turn the rotary actuator 36 in the opposite direction so as to return the retention element 28 to its releasing position.

It has been shown, in practice as well, that the invention fully achieves the intended aim and objects.

In particular, the locking system according to the invention comprises a single rotary retention element that directly engages, i.e., without intermediate sliding elements, all the locking pins. This circumstance makes the locking system according to the invention less subject to wear and plays than known systems, thereby improving positioning accuracy and reliability.

Figure 12:
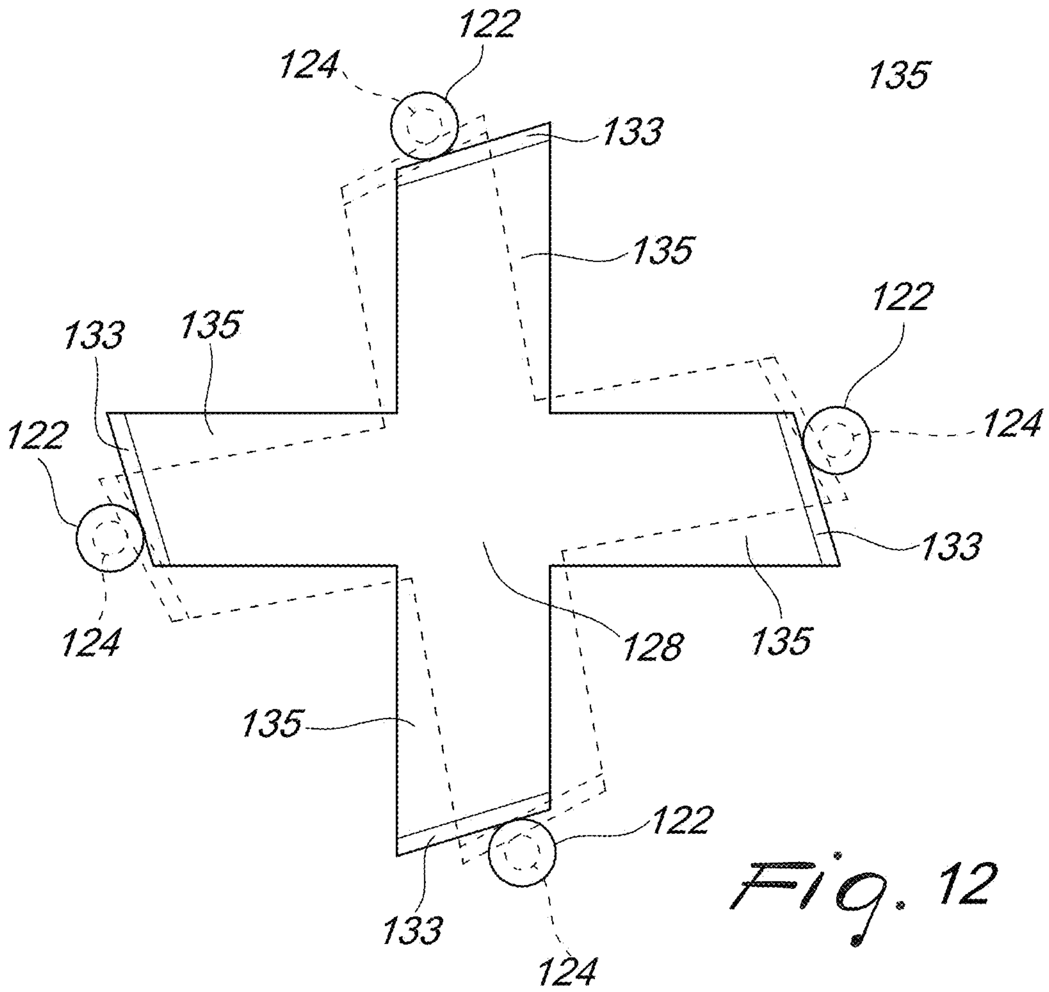
FIG. 12 is a schematic view of an element of the locking system according to an alternative embodiment of the invention.
Figure 13:
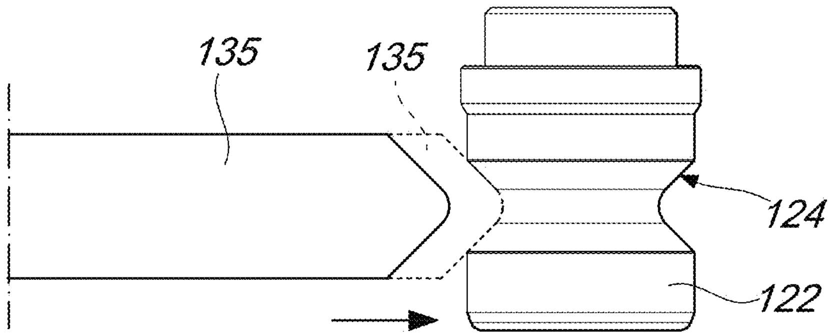
FIG. 13 is an enlarged-scale lateral elevation view of a detail of FIG. 12.

FIG. 12 schematically shows a retention element 128 according to an alternative embodiment of the invention, in the releasing position (solid line), in which contoured surfaces 133 do not engage grooves 124 of locking pins 122, and in the locking position (dashed line), in which the contoured surfaces 133 engage the grooves 124. In this alternative embodiment, the retention element 128, instead of having a cylindrical profile with surfaces contoured in the form of recesses, as in the previous embodiment, is cross-shaped, and the contoured surfaces 133 are formed at the ends of four arms 135 of the cross. Moreover, in this alternative embodiment, the contoured surfaces 133 have a rectilinear profile that is oblique with respect to the radius connecting the axis of rotation A' to the axis of the locking pin 122, but they could also have a circular arc-shaped profile with the concavity directed inward, as in the case of the contact portions of the contoured surfaces of the previous embodiment.

Some preferred embodiments of the invention have been described, but of course the person skilled in the art may make various modifications and variations within the scope of the claims.

For example, as the person skilled in the art will easily understand, the system described here may be used to lock any fixture or workpiece, either directly or with the interposition of a fixing plate, as in the example described here in relation to the locking of a vise.

Moreover, with variations that will be obvious to the person skilled in the art, the locking system can be adapted to lock two, three, or five or more pins according to the specific requirements.

Of course, alternative actuation means can be provided to actuate the rotation of the retention element, for example a worm gear mechanism meshing with a toothed sector of the retention element, a lever system, or other similar locking systems.

The described engagement means, which provide for a rotary actuator equipped with an eccentric tab that engages a seat of the retention element that is spaced from the axis of rotation, could also be modified. For example, in principle, the actuation axis around which the rotary actuator rotates could be parallel rather than radial with respect to the axis of rotation of the retention element, so as to engage, with an eccentric tab thereof, a seat provided on one of the faces that axially delimit the retention element in a position that is axially offset with respect to the axis of rotation.

Not least, in the examples described, the contact portions of the contoured seats have either a circular arc-shaped profile with the concavity directed inward (first embodiment) or a rectilinear profile (second embodiment). Of course, the person skilled in the art can easily devise other suitable curved profiles, for example in order to vary the progression of the force applied during locking.

The disclosures in Italian Patent Application No. 102023000015645 from which this application claims priority are incorporated herein by reference.

What is claimed is:

1. A locking system for mechanical components, comprising a platform having a support surface for a mechanical component and provided with at least two locking seats extended around respective axes which are perpendicular to said support surface and open on the support surface, said locking seats being adapted to coaxially receive respective locking pins which are fixed to a mechanical component and are provided with respective circumferential grooves adapted to be restrainedly engaged by retention means associated with said platform, wherein said retention means comprise a rotary retention element which is supported by said platform so that it can rotate about an axis of rotation which is perpendicular to said support surface for rotating between a releasing position and a locking position upon control of actuation means, and is provided with a peripheral edge which, at each of said locking seats, has a contoured surface having such a profile as to restrainedly engage said grooves when said rotary retention element is in said locking position, and disengage said grooves when said rotary retention element is in said releasing position.

2. The locking system according to claim 1, wherein each of said contoured surfaces is provided with a contact portion that is delimited between a first end and a second end and has an outer profile that progressively departs from said axis of rotation, so as to engage said groove at an intermediate point between said first end and said second end when said retention element is in the locking position.

3. The locking system according to claim 2, wherein said contact portion has a circular arc-shaped profile having a concavity thereof facing inward.

4. The locking system according to claim 2, wherein said peripheral edge generally has a cylindrical profile and each of said contoured surfaces forms a recess of said cylindrical profile, said contact portion being comprised between a first end portion and a second end portion of said recess.

5. The locking system according to claim 4, wherein said first end portion has a circular arc-shaped profile having a concavity thereof facing outward and a diameter that is greater than, or equal to, a diameter of said locking pin.

6. The locking system according to claim 4, wherein said second end portion has a circular arc-shaped profile having a concavity thereof facing outward and a diameter that is smaller than a diameter of the locking pin.

7. The locking system according to claim 4, wherein said contact portion has a circular arc-shaped profile having a concavity thereof facing inward and a diameter that is larger than said first end portion.

8. The locking system according to claim 2, wherein said groove is delimited axially between a first frustoconical surface which is directed toward said mechanical component and is adapted to be engaged by said retention means, wherein each of said contoured surfaces has an edge thereof chamfered at least on a side directed toward said first frustoconical surface, so as to engage the first frustoconical surface with a first oblique face of said contact portion which has a same inclination.

9. The locking system according to claim 1, wherein said actuation means comprise a rotary actuator which is supported by the platform so that it can rotate about an actuation axis and is provided with an eccentric tab which engages a corresponding seat of the rotary retention element which is spaced from said axis of rotation, said rotary actuator being manually actuatable in order to cause the rotary retention element to rotate between said locking position and said releasing position by engagement between said eccentric tab and said seat.

10. The locking system according to claim 9, wherein said actuation axis extends radially with respect to said axis of rotation, and wherein said seat is provided on said peripheral edge of said rotary retention element.

* * * * *